United States Patent

Zaluzec et al.

[11] Patent Number: 5,958,521
[45] Date of Patent: Sep. 28, 1999

[54] METHOD OF DEPOSITING A THERMALLY SPRAYED COATING THAT IS GRADED BETWEEN BEING MACHINABLE AND BEING WEAR RESISTANT

[75] Inventors: Matthew J. Zaluzec, Canton; Armando M. Joaquin, Rochester Hills; Oludele O. Popoola, Grand Blanc, all of Mich.

[73] Assignee: Ford Global Technologies, Inc., Dearborn, Mich.

[21] Appl. No.: 08/666,071

[22] Filed: Jun. 21, 1996

[51] Int. Cl.$^6$ .................................. C23C 4/06; C23C 4/16
[52] U.S. Cl. ...................... 427/449; 427/453; 427/454; 427/455; 427/456; 219/76.12; 219/76.14; 219/76.16
[58] Field of Search ....................... 427/449, 453, 427/454, 455, 456; 219/76.12, 76.14, 76.16

[56] References Cited

U.S. PATENT DOCUMENTS

| | | |
|---|---|---|
| 2,588,422 | 3/1952 | Shepard . |
| 3,077,659 | 2/1963 | Holzwarth et al. . |
| 3,900,200 | 8/1975 | Nakamura ............................. 277/235 A |
| 3,991,240 | 11/1976 | Harrington et al. ................. 29/192 CP |
| 4,110,512 | 8/1978 | Roy et al. ................................ 428/469 |
| 4,687,678 | 8/1987 | Lindblom ................................ 427/453 |
| 4,982,067 | 1/1991 | Marantz et al. ...................... 219/76.16 |
| 5,080,056 | 1/1992 | Kramer et al. ..................... 123/193 CP |
| 5,271,967 | 12/1993 | Kramer et al. ........................... 427/455 |
| 5,334,235 | 8/1994 | Dorfman et al. .......................... 75/255 |
| 5,466,906 | 11/1995 | McCune, Jr. et al. .................. 427/449 |
| 5,468,295 | 11/1995 | Marantz et al. ...................... 219/76.14 |

*Primary Examiner*—Katherine A. Bareford
*Attorney, Agent, or Firm*—Joseph W. Malleck

[57] ABSTRACT

A method of thermally spraying a coating onto the interior of a cylindrical surface which coating is graded between enhanced optimal machinability and enhanced wear resistance. The method comprises the steps of; (a) preparing a cylindrical bore surface of a light metal substrate cleansed of grease and oils and modified to alter any oxide film present thereon; (b) thermally spraying a deposit of metallic droplets or particles onto the prepared bore surface using metal wire or powder feedstocks (low carbon steel or stainless steel) and a primary atomizing gas that projects the droplets or particles as a spray, the droplets or particles having a chemistry capable of metallurgically bonding with the metal of the substrate, the spray being positioned to lay down a generally uniform coating of such droplets or particles; and (c) varying the chemical content of the atomizing gas in two or more stages to proceed from essentially a metal droplet oxide-forming gas (air or oxygen) to essentially an inert or non-oxidizing gas (nitrogen or argon) relative to the droplets or particles.

7 Claims, 4 Drawing Sheets

METHOD OF DEPOSITING A THERMALLY SPRAYED COATING THAT IS GRADED BETWEEN BEING MACHINABLE AND BEING WEAR RESISTANT

BACKGROUND OF THE INVENTION

1. Technical Field

This invention relates to the technology of thermally spraying metallic coatings onto metal substrates and more particularly to coatings that have both enhanced machinability and enhanced wear resistance when adhered to light weight metals, such as aluminum.

2. Discussion of the Prior Art

It is known to apply thermally sprayed coatings to cylinder bores of a cast aluminum engine block to improve the wear resistance of the aluminum surface and thereby eliminate (a) the need for inserting cast-iron liners to withstand the sliding contact of steel piston rings, or (b) the need to use high silicon content aluminum alloys that require treatment to precipitate hard wear particles to withstand sliding contact. The thermally sprayed coatings can be applied in a relatively thin thickness, i.e. 100–1000 micrometers (0.1–1.0 mm. or 0.0004–0.04 inches), to promote economy of materials while meeting performance needs.

One of the drawbacks to using thermally sprayed coatings on cylinder bores is that it has prompted a significant change in the method of finishing the coated surface of the bores due in part to their increased surface hardness. Such increased hardness leads to shorter tool life during machining. Honing tools are generally self-aligned and floatingly supported to follow the geometry of the coating on the cylinder bore, rather than to remove material about an axis independent of the coated surface. Honing of this type is undesirable because thermally sprayed coatings tend to vary in thickness from side to side as well as from top to bottom of the bore wall. Such honing procedure may produce uneven coating removal and variations in coating thicknesses along the cylinder bore wall. If the finished surface is not in absolute alignment with the axis of the crank bore, proper fit of the piston assembly may be difficult or lead to premature wear. It would be desirable and cost effective if the thermally sprayed coating were to be deposited in a manner to allow for direct honing or machining of the confine that is oriented to the true axis of the crank bore (bearing housing) without the fear that the coating will be distorted or injured.

SUMMARY OF THE INVENTION

The invention is a method of thermally spraying a coating onto the interior of a cylindrical surface which coating is graded between enhanced optimal machinability and enhanced wear resistance. The method comprises the steps of; (a) preparing a cylindrical bore surface of a light metal substrate cleansed of grease and oils and modified to alter any oxide film present thereon; (b) thermally spraying a deposit of metallic droplets or particles onto the prepared bore surface using metal or powder wire feedstocks and a primary atomizing gas that projects the droplets or particles as a spray, said droplets or particles having a chemistry capable of metallurgically bonding with the metal of the substrate, the spray being positioned to lay down a generally uniform coating of such droplets or particles; and (c) varying the chemical content of the atomizing gas in two or more stages to proceed from essentially a metal droplet oxide-forming-gas to essentially an or inert or non-oxidizing gas relative to the droplets or particles. The metal wire or powder feedstock can be comprised of low carbon steel or stainless steel; the metal oxide-forming-gas can be comprised of air or oxygen; and the inert or non-oxidizing gas can be comprised of nitrogen or argon. The oxide-forming-gas will encourage the metal droplets or particles to first lay down a composite layer or gradation of iron and Wuestite (FeO) which is advantageously present in a amount of 10–30% by weight of the coating. When the inert or non-oxidizing gas is deployed, FeO will be present in an amount much less than 10% by weight and can be considered oxide-depleted. The underlying composite layer will be the wear resistant layer destined to remain on the bore wall after honing, while the oxide-depleted over layer will be removed by honing, as being sacrificial and substantially enhancing to honing tool life.

DETAIL DESCRIPTION AND BEST MODE

Figure 1:
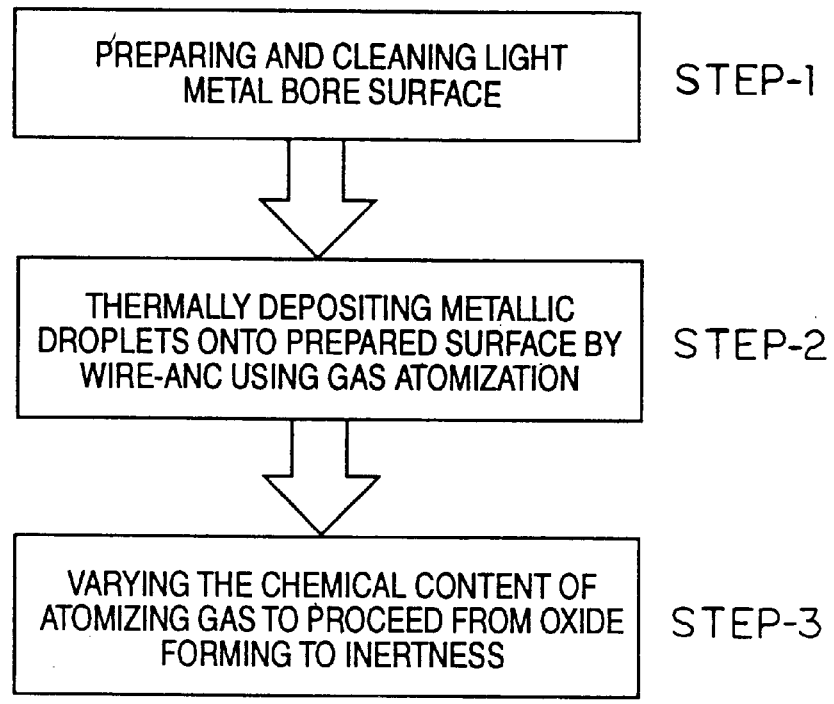
FIG. 1 is a block diagram of the essential steps of this invention.
Figure 2:
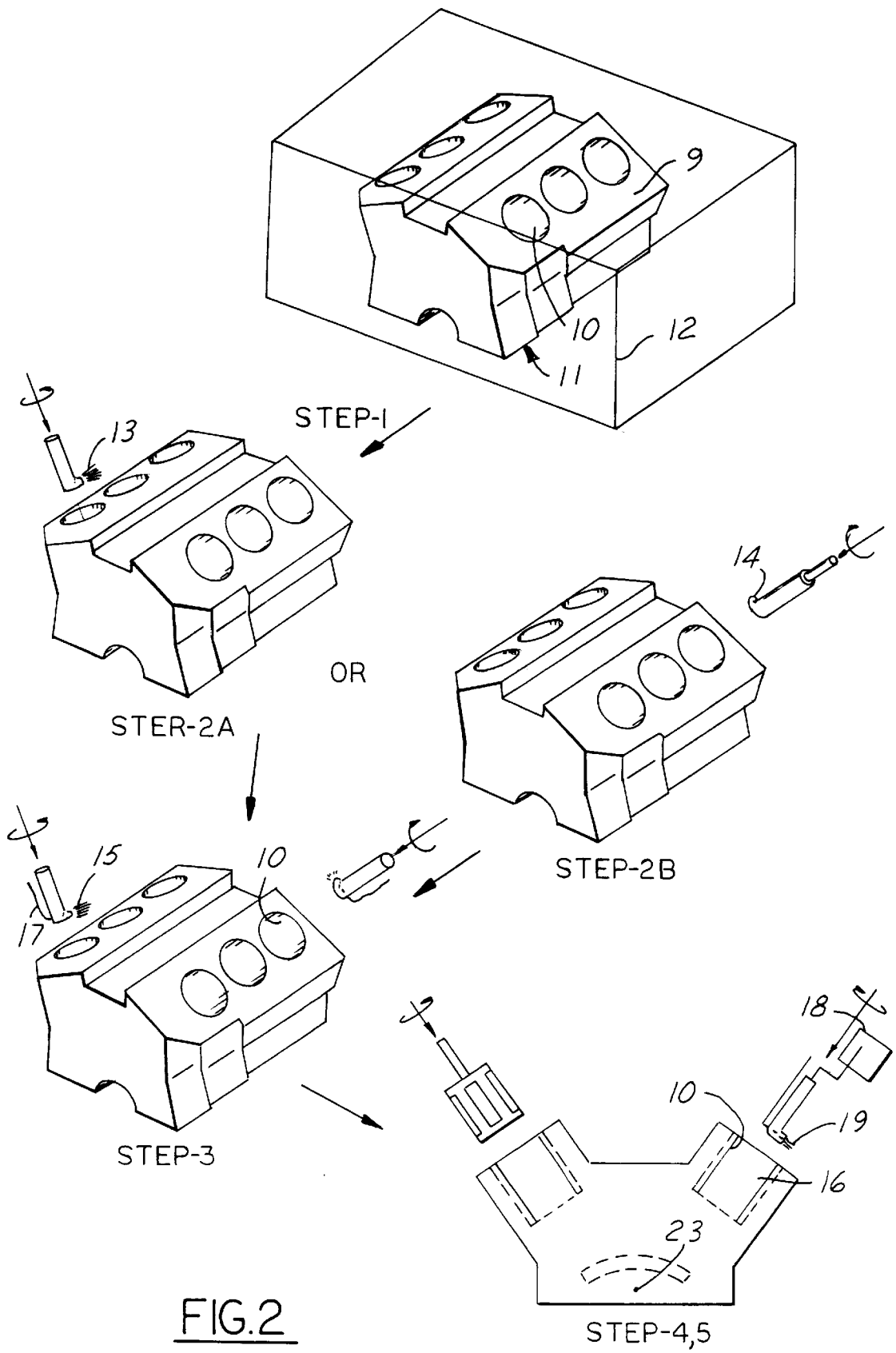
FIG. 2 is a flow diagram of the process steps of this invention.

The essential method steps of making a graded coating according to this invention is generally shown is FIG. 1. As shown in somewhat more particularity in FIG. 2, surface 10 of a component or substrate 9, to be thermally sprayed is prepared by cleaning and/or roughening; the surface 10 is the interior of a cylindrical bore of a cast light metal (i.e. aluminum or magnesium) block 11 of an automotive engine. Cleaning may preferably comprise vapor degreasing in a chamber 12 (see step 1) or washing in an aqueous solution to remove all grease and oils that result from the casting and machining operations prior to surface preparation. Further preparations may either comprise application of a flux or chemical striping agent 13 to the surface (see step 2A) to remove any surface oxide when heat activated, or roughening (see step 2B) surface 10 by any one of a variety of techniques such as grit blasting, high pressure water jetting, or some other type of machining such as rough machining or honing 14 to change the surface finish of the substrates to more readily mechanically lock with the intended coating while removing some surface oxides at the same time. It is important that any residual surface contaminants from the roughening step be removed prior to thermal spraying.

Irrespective of the type of cleaning or preparation, it is desirable to apply a metallized bond coat (see step 3 of FIG. 2) to the surface 10 of the light metal to complete the surface preparation. This comprises thermal spraying of a metal bonding alloy 15 that has a high propensity to metallurgically bond with the light metal of the surface 10, such as nickel aluminide (95% Ni/5% Al) or bronze aluminide (90% bronze/10% Al) for an aluminum substrate. The bond coat is advantageously applied in a uniform thickness of about 25–75 micrometers by wire arc, wire plasma, or powder plasma spraying; this range of thickness is determined by the minimum thickness needed to achieve a uniform bond coat coverage.

The surface is now ready for the deposition of the final thermal spray of melted droplets or particles 19 to create the intended multilayer or chemically graded top coating 16 (step 4). This is carried out by use of any thermal spraying technique using one or more wire or powder feedstocks 17 and at least a primary atomizing gas 18 that projects the droplets 19 or particles onto the surface 10. The feedstock is desirably a low carbon or low alloy steel containing 0.04–0.2% by weight carbon, 0.025–0.04% silicon, 0.2–2.0% manganese, 0.0–1.5% chromium, 0.0–1.5% molybdenum, 0.0–4.0 nickel, less than 0.5% copper with the balance being iron. Stainless steel feedstocks of the 300 or 400 series are particularly useful for engines that are designed to work with flex fuels. The thermally sprayed top coat 16 will have a preferred thickness of 0.008–0.02 inches.

In step 4, the chemical content of the atomizing or spraying gas is varied or changed in two or more stages to proceed from essentially an oxide-forming gas to essentially an inert gas relative to the droplets or particles. This will create a layered or gradually graded composite coating 16 having less than 1–10% $Fe_xO$ in its exposed outer region and 10–30% $Fe_xO$ in its inner region. $Fe_xO$ is used herein to mean Wuestite. This layered or gradually graded coating is desirable because the outer region 21 has a soft, relatively oxide free, machinable outer region while the inner regions 22 has a harder, oxide possessing content that is not as easily machinable, but provides wear and scuff resistance.

Figure 3:
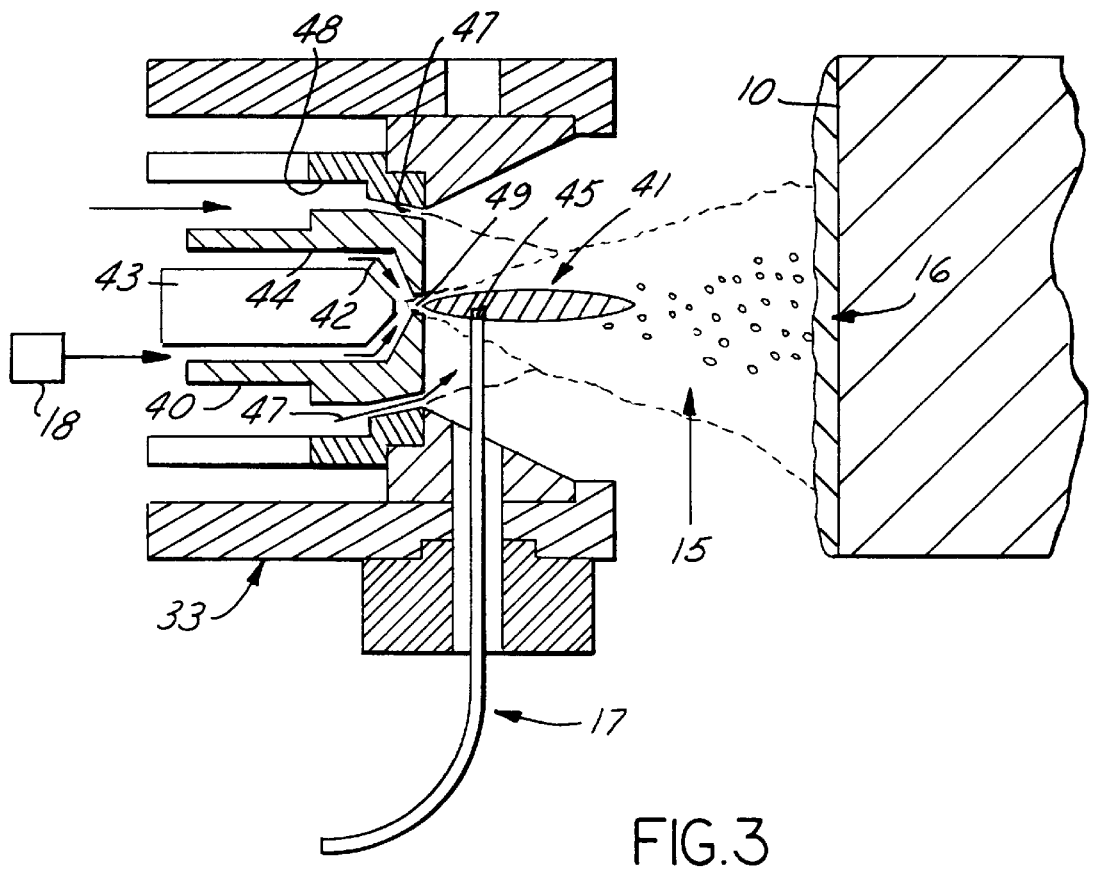
FIG. 3 is an enlarged schematic of an exemplary spray head apparatus used to thermally deposit the coatings of this invention.

The multi-layer or graded coating may be deposited using a thermal spray gun 33 as depicted in FIG. 3. The gun may be comprised of an inner nozzle 40 which focuses a heat source, such as a flame or plasma plume 41. The plasma plume 41 is generated by the stripping of electrons from the primary gas 42 as it passes between the anode 43 and the cathode 44 resulting in a highly heated ionic discharge or plume. The heat source melts the wire tip or powder 45 and the droplets 46 therefrom are carried by the primary gas 42 at a great velocity. A pressurized second gas 47 may be used to further control the spray pattern. Such secondary gases maybe introduced through channels formed between the cathode and the housing 48. The secondary gas is directed radially inwardly with respect to the axis of the plume. Melting of the wire is effected by connecting the wire as an anode in striking an arc 49 with the cathode. The resultant coating will be constituted of splat layers or particles having an iron alloy core in a thin shell of $Fe_xO$. The same coating structure can be achieved also with two-wire arc powder plasma spraying.

Finally (see step 5 of FIG. 2), the coating goes through a semi-finish and finish machining operation, such as by a typical boring operation, to remove 0.005–0.02 inches of top coating, to thereby machine away that portion of the outer region that contains the least amount of $Fe_xO$ and thus is more easily machined. The machining produces a final surface finish of 0.5–5.0 micrometers $R_a$ and a final surface alignment that coincides with the center line 23 of the crank bore axis of the block. Such machining can be carried out by use of conventional carbide or hard coated tooling. Wear of such tool is reduced because of the reduced oxide content of the top coating and very little of the hard inner coating contacted by the tool.

Figure 6:
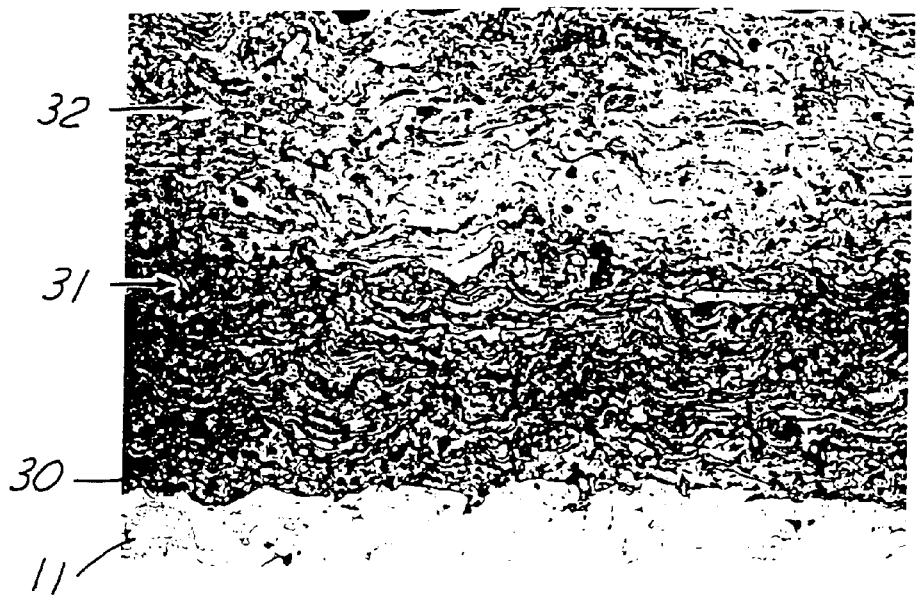
FIG. 6 is a cross-sectional microphotograph (100×) of a multilayer coating deposited in accordance with this invention.
Figure 4:
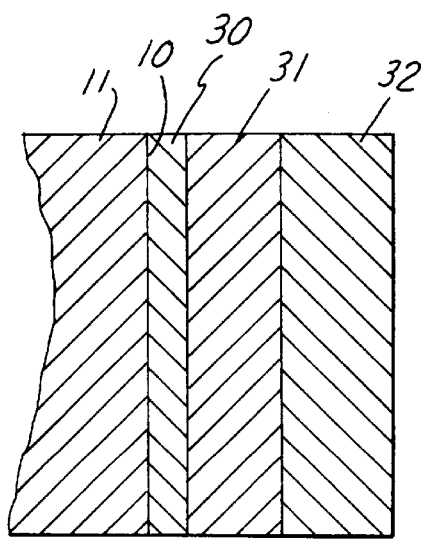
FIG. 4 is a schematic illustration of a three layer coating system applied in accordance with one mode of this invention.

A preferred method for creating a multilayer $Fe_xO$ composite coating with a machinable top layer, is carried out as follows. A bond coat is applied to enhance coating adhesion in a thickness of about 0.001–0.003 inches (25–75 micrometers) after the surface has been prepared as previously described. The machinable, wear resistance top coating is applied in at least a two step application. The intermediate hard $Fe/Fe_xO$ wear and scuff resistance coating is applied in a thickness of 0.004–010 (100–200 micrometers) inches by thermally spraying steel feedstock material using air as the primary atomizing gas to deposit an underlayer. A sacrificial and machinable outer layer is then deposited by thermally spraying the steel feedstock using nitrogen or argon as the primary atomizing gas to produce a soft, relatively, oxide free, machinable top layer. The resulting multilayer coating (illustrated in FIG. 4 and 6) will desirably consist of a 0.002 (50 micrometer) inch bond coat 30, a 0.010 inch (250 micrometer) thick $Fe/Fe_xO$ intermediate layer 31, and a 0.010 (250 micrometer) inch machinable top layer 32 as shown schematic in FIG. 4. The intermediate wear and scuff resistant coating will contain between 10–30% by volume of the $Fe_xO$ oxide phase, whereas the machinable top layer will contain from less than 1–10% by volume of the $Fe_xO$ oxide phase. For a conventional engine application, low carbon and low alloy steel feedstock can be used to deposit such iron/iron oxide composite multilayer coating suitable for engine cylinder bore application. For more aggressive environment, 300 and 400 series stainless feedstock can be used to deposit $Fe_xCr_y/Fe_xCr_yO_2$ and $Fe_xCr_yNi_2Fe_wCr_x/Ni_yO_2$ composite multilayer coating with enhanced corrosion resistance for engine flexibly using more than one fuel, such as methanol and ethanol blends, and those containing high sulfur and/or other corrosive compounds.

Figure 5:
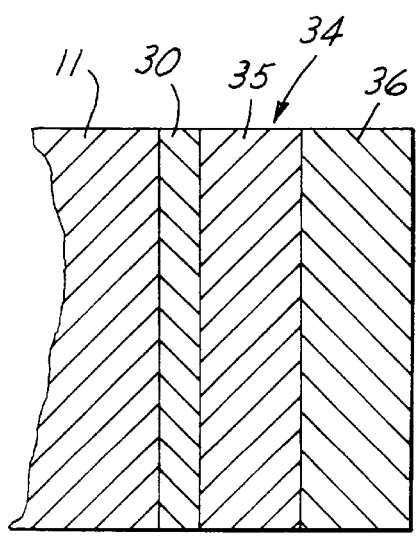
FIG. 5 is a schematic illustration of a progressively chemically graded coating applied in accordance with another mode of this invention.

To thermally spray a graded chemically composite coating, the same type of bond coat 30 is applied. Then the machinable wear resistance composite is applied in a single step application. The hard $Fe/Fe_xO$ wear and scuff resistance coating 34 containing up to 30% of the self lubricating phase $Fe_xO$, is produced by initially thermally spraying the steel feedstock using air as the primary atomizing gas. As spraying proceeds, the primary gas is mixed gradually with increasing amounts of nitrogen and/or argon to produce a graded compositions. The composition of the gas mixture will gradually change from 100% air to 100% nitrogen and/or argon. With multiple passes of the spray gun 33, that is being lowered and raised while rotated, the thermally sprayed graded coating 34 is deposited continuously as the gas transitions from 100% air to 100% nitrogen and/or argon. The resultant coating (see FIG. 5) is chemically graded from a mixed $Fe/Fe_xO$ composite region 34 containing up to 30% $Fe_xO$ to an outermost region 36 containing less than 1% $Fe_xO$. This chemically graded coating will have enhanced machinability at the outer most region while providing the wear and scuff resistance characteristics, following finish machining or finish honing, that is desirable for final cylinder bore.

Figure 7:
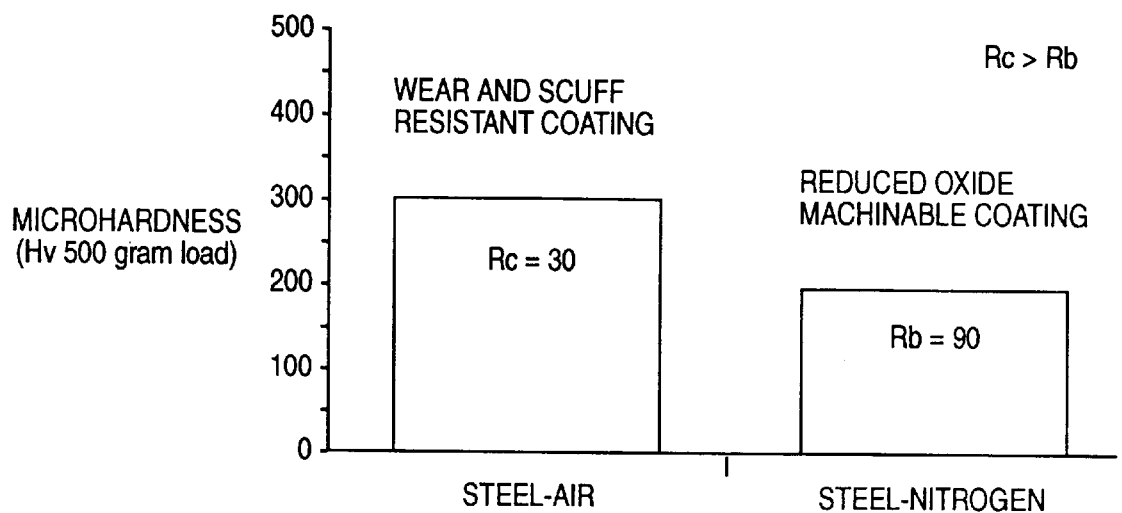
FIG. 7 is a graphical illustration comparing the microhardness of different zones of the graded or multilayer coating.
Figure 8:
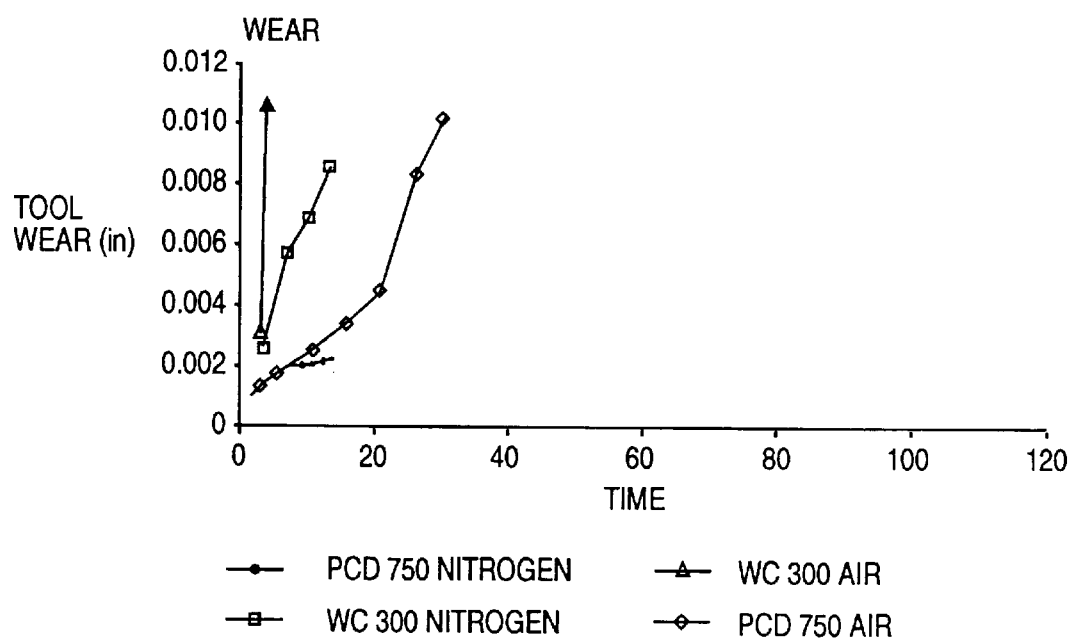
FIG. 8 is a graphical illustration comparing tool wear when machining the different zones of the layered or graded coating.

FIG. 7 shows the difference in coating hardness between the reduced oxide machinable outer coating and the higher oxide wear and scuff resistant coating. As applied to the 319Al cylinder bore substrate, the 0.010" sacrificial/machinable top coating is removed during machining to locate and size the bore. FIG. 8 shows the relative tool wear associated with machining thermally sprayed steel coatings deposited using air and nitrogen atomizing gas. The tool wear associated with machining thermally sprayed steel coatings with nitrogen atomizing gas is reduced by 6 times when compared with coatings deposited using air atomization.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of thermally spraying a coating onto an interior of a cylindrical surface, which coating is graded between machinability and wear resistance, comprising; (a) preparing a cylindrical bore surface of a metal substrate to be cleansed of grease and oils and modified to alter or remove any oxide present thereon; (b) thermally spraying a deposit of metallic droplets or particles onto said prepared bore surface using (i) metal wire or powder feedstocks, and (ii) an atomizing gas that projects the droplets or particles as a spray, said droplets or particles being capable of metallurgically bonding with said metal substrate, said spray being positioned, to lay down a generally uniform coating of such droplets of particles in initial and later stages, and (c) varying chemical content of said gas in two or more stages providing initially sprayed droplets or particles to have a higher hardness and wear resistance accompanied by decreased machinability when compared to the sprayed droplets or particles of the later stages, while the later stages of the sprayed droplets or particles have a decreased hardness accompanied by increased machinability when compared to the initially sprayed droplets or particles.

2. The method as in claim 1 which further comprises a step (d) in which material removal is carried out on at least a portion of the droplets or particles sprayed in the later stages to align the bores, remove excess material and present a finished surface having higher wear resistance.

3. The method as in claim 1, in which the metal substrate is an aluminum or magnesium alloy engine block containing a plurality of cylindrical bore surfaces to be coated.

4. The method as in claim 1, in which the cylindrical surface is altered as part of preparation by either (i) mechanically roughening the surfaces by grit blasting, water jetting, or machining to disrupt any oxide film present on the surfaces, or (ii) chemical stripping any oxide film on said cylinder bore surface, followed by deposition of a metallic bond coating thereon.

5. The method as in claim 1, in which the wire feedstock is steel and the gas is regulated in two or more stages to proceed from an iron oxide forming gas in the initial stages to essentially an inert gas in the later stages.

6. The method as in claim 5, in which the iron oxide forming gas is air, which when contacted with the steel droplets or particles forms FeO and the inert gas is selected from nitrogen or argon to limit formation of any oxide in said droplets or particles to less than that formed by the oxide forming gas.

7. A method of thermally spraying a coating onto an interior of a cylindrical surface, which coating is graded between machinability and wear resistance, comprising; (a) preparing a cylindrical bore surface of a metal substrate to be cleansed of grease and oils and modified to alter or remove any oxide film present thereon; (b) thermally spraying a bond coat onto said substrate, said bond coat being deposited in a thickness of 0.001–0.003 inches and is thermally sprayed by use of an inert atomizing gas; (c) thermally spraying an underlayer of a top coating by a wire arc technique using air as the atomizing gas, the underlayer being deposited in a thickness of 0.004–0.010 inches and being comprised of FeO in a first amount; (d) thermally spraying an outer layer of the top coating by a wire arc technique using an inert gas as the atomizing gas, the outer layer having a thickness in the range of 0.004–0.010 inches and having a FeO content of less than said first amount, said wire arc thermal spraying utilizing a low carbon alloy steel feedstock, and (e) machining away at least a portion of the outer layer to present a finished surface.

* * * * *